(12) United States Patent
Harper (10) Patent No.: US 8,065,243 B2
(45) Date of Patent: Nov. 22, 2011

(54) OPTIMIZING OPERATIONS OF A HYDROGEN PIPELINE SYSTEM

(75) Inventor: Charles N. Harper, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 887 days.

(21) Appl. No.: 12/105,985

(22) Filed: Apr. 18, 2008

(65) Prior Publication Data

US 2009/0265292 A1 Oct. 22, 2009

(51) Int. Cl.
*G06F 15/18* (2006.01)
*G06N 3/00* (2006.01)
*G06N 3/12* (2006.01)

(52) U.S. Cl. ......................................... 706/13

(58) Field of Classification Search .................. None
See application file for complete search history.

(56) References Cited

U.S. PATENT DOCUMENTS

| | | | |
|---|---|---|---|
| 7,444,189 B1 | 10/2008 | Marhoefer | |
| 2006/0058985 A1 | 3/2006 | Arslan et al. | |
| 2006/0115413 A1* | 6/2006 | Wegeng et al. | 423/650 |
| 2006/0259319 A1 | 11/2006 | Mattiola et al. | |
| 2009/0115910 A1* | 5/2009 | Takeuchi et al. | 348/714 |

FOREIGN PATENT DOCUMENTS

WO 03107508 12/2003

OTHER PUBLICATIONS

Mora et al. "Minimization of Energy Use in Pipeline Operations—An Application to Natural Gas Transmission Systems", IECON, 2005, pp. 8.*
Masui "Graphic Object Layout with Interactive Genetic Algorithms", IEEE workshop on Visual Language, 1992, pp. 74-80.*
Xie et al. "Incorporating Domain-Specific Knowledge into Evolutionary Algorithm", Beijing Mathematics 4 (2), 1998, pp. 6.*
PCT Search Report and Written Opinion for PCT/US09/40810.
Heever et al., "A Strategy for the Integration of Production Planning and Reactive Scheduling in the Optimization of a Hydrogen Supply Network," Computers and Chemical Engineering, vol. 27, pp. 1813-1839, Dec. 15, 2003.
Hugo et al., "Hydrogen Infrastructure Strategic Planning Using Multi-objective Optimization," International Journal of Hydrogen Energy, vol. 30, p. 1523-1534. Dec. 2005.

* cited by examiner

*Primary Examiner* — Jeffrey A Gaffin
*Assistant Examiner* — Li-Wu Chang
(74) *Attorney, Agent, or Firm* — Elwood L. Haynes (57) ABSTRACT

Embodiments of the invention provide a computerized optimization system configured to optimize the operations of a hydrogen generation, processing, and delivery network. Such a network typically includes a complex of physical equipment, plants, and pipelines, including both production and distribution facilities. A hydrogen optimization system provides a software system that optimizes the production and distribution of hydrogen over such a hydrogen network. The hydrogen optimization system may use both a genetic algorithm configured to "evolve" a population of solutions to improve the quality of solutions over time as well as directed heuristics to identify a superior operating state for the hydrogen pipeline network.

31 Claims, 9 Drawing Sheets

OPTIMIZING OPERATIONS OF A HYDROGEN PIPELINE SYSTEM

BACKGROUND

Generally, a hydrogen pipeline system provides a continuous pipe conduit, complete with equipment such as valves, compressor stations, communications systems, and meters, for transporting hydrogen from one point to another, usually from one point (or points) of production or processing to another, or to points of use.

Optimizing the operations of a hydrogen pipeline system is a complex task. In particular, optimizing a pipeline system to account for power costs of various nodes, for reconfigurable elements (e.g., a pipeline element that can act to increase pressure or flow, or decrease pressures or flows at a particular node of the pipeline), and for contractually obligated output and pressure requirements and at various nodes, has proven to be a difficult task. Further, a variety of different sources may introduce hydrogen into the pipeline at different purity levels; this difference in purity for input feeds (as well as output feeds) complicates the optimization process. Commercially-available pipeline optimization systems have been generally unable to provide satisfactory solutions for configuring complex pipeline systems. In particular, commercially-available pipeline optimization systems have been unable to account for the variety of factors that may impact on the operational cost of operating the pipeline. Instead, such systems often constrain a variety of these variables and seek to optimize an isolated aspect of pipeline operation, assuming that the others may be optimized independently. Often, this has lead to sub-optimal solutions. Moreover, even when current systems have proven capable of identifying a highly-quality solution, they often fail to do so in a reasonable amount of time.

SUMMARY

Embodiments of the invention provide an optimization system that may be used to identify low-cost solutions to operating a hydrogen pipeline based on a variety of operational constraints and the nuances involved in operating such a system.

One embodiment of the invention includes a computer-implemented method of optimizing operations of a hydrogen pipeline network. The method may generally include reading a set of input data describing a hydrogen pipeline, a plurality of hydrogen production sources configured to introduce hydrogen into the hydrogen pipeline, a plurality of hydrogen consumers configured to remove hydrogen from the pipeline, a plurality of optimization parameters to use in an optimization run, and one or more optimization run termination conditions. The method may also include generating a population of solutions, where each solution specifies a feasible operating state for the hydrogen pipeline, the plurality of hydrogen production sources, and the plurality of hydrogen consumers. The method further includes evaluating each solution in the population of solutions to generate an evaluation score for each solution and repeatedly performing a genetic optimization process on the population of solution to evolve the population of solutions until one of the termination conditions are satisfied. The method may also include selecting one of the solutions from the evolved population of solutions, where the selected solution has a highest evaluation score, relative to the solutions in the evolved population of solutions. The method may also include applying one or more heuristic rules to the selected solution, where each heuristic is applied to further optimize the operating state for the hydrogen pipeline specified in the selected solution.

In a particular embodiment, the genetic optimization process specifies hydrogen flows through the pipeline and the allocation of flows through looping segments of the pipeline and a direct pressure optimization technique is used to optimize pressures once the hydrogen flows are allocated by the genetic optimization process. The hydrogen production sources may include one or more steam methane reforming units, one or more off-gas processing units, one or more storage facilities, e.g., salt domes, aquifers, buried storage tanks, and one or more third-party supply sources.

Additionally, the step of performing the genetic optimization process may itself include modifying at least one aspect of the feasible operational state specified by at least one solution in the population, simulating the operation of the hydrogen pipeline network, according to the operational state specified by the modified solution and evaluating the performance of the modified solution. The genetic optimization process may further include adding the modified solution to the population and selecting a solution from the population to remove from the population of the solutions. Further still, the set of input data may be generated using data retrieved from a Supervisory Control and Data Acquisition (SCADA) pipeline status database that stores a current operational state of the pipeline system.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE PREFERRED EMBODIMENTS

Embodiments of the invention provide a computerized optimization system configured to optimize the operations of a hydrogen generation, processing, and delivery network. Such a network typically includes a complex of physical equipment, plants, and pipelines, including both production, storage and distribution facilities. A hydrogen optimization system provides a software system that optimizes the production and distribution of hydrogen over such a hydrogen network. Generally, the term "optimization" is used herein to describe a change in the state of pipeline operation that is superior to others, usually in terms of power requirements or other operating costs. Note, however, embodiments of the present invention are not required to identify an optimal, or best, solution to configuring a hydrogen pipeline. Instead, the term optimization generally refers to finding acceptable solutions to difficult problems in a reasonable amount of time.

Examples of optimizations that may be made using the optimization system disclosed herein include, e.g., reduction of power costs by finding effective equipment settings; selection of feeds to support required levels of purity; modeling and optimization of multi-step compressors; minimizing penalties of take-or-pay and other types of supply contracts; and satisfaction of other constraints on system operations. Thus, at least one embodiment of the optimization system disclosed herein may be used to minimize the power costs required to operate a hydrogen pipeline network while simultaneously providing contractually obligated outlet pressures (material flow) to customers located at various nodes of the pipeline.

In one embodiment, operational constraints may include both "hard" constraints and "soft" constraints. A hard constraint specifies a requirement that a solution to an optimization problem must satisfy if a solution generated by the optimization program is to be regarded as feasible. Conversely, violating a hard constraint renders a solution infeasible. Examples of hard constraints include: maximum and minimum pressures and flows; maximum valve opening on regulators; selection of gas feeds; selection of plants that are required to be on or off; and recirculation limits on compressor models. One example of a soft constraint includes a "take-or-pay" agreement where a pipeline operator must pay for available product or materials, whether used or not. In the case of a soft constraint, if other efficiencies of a particular pipeline configuration compensate for an incurred penalty, then such a configuration may be acceptable, or even preferred.

Figure 1:
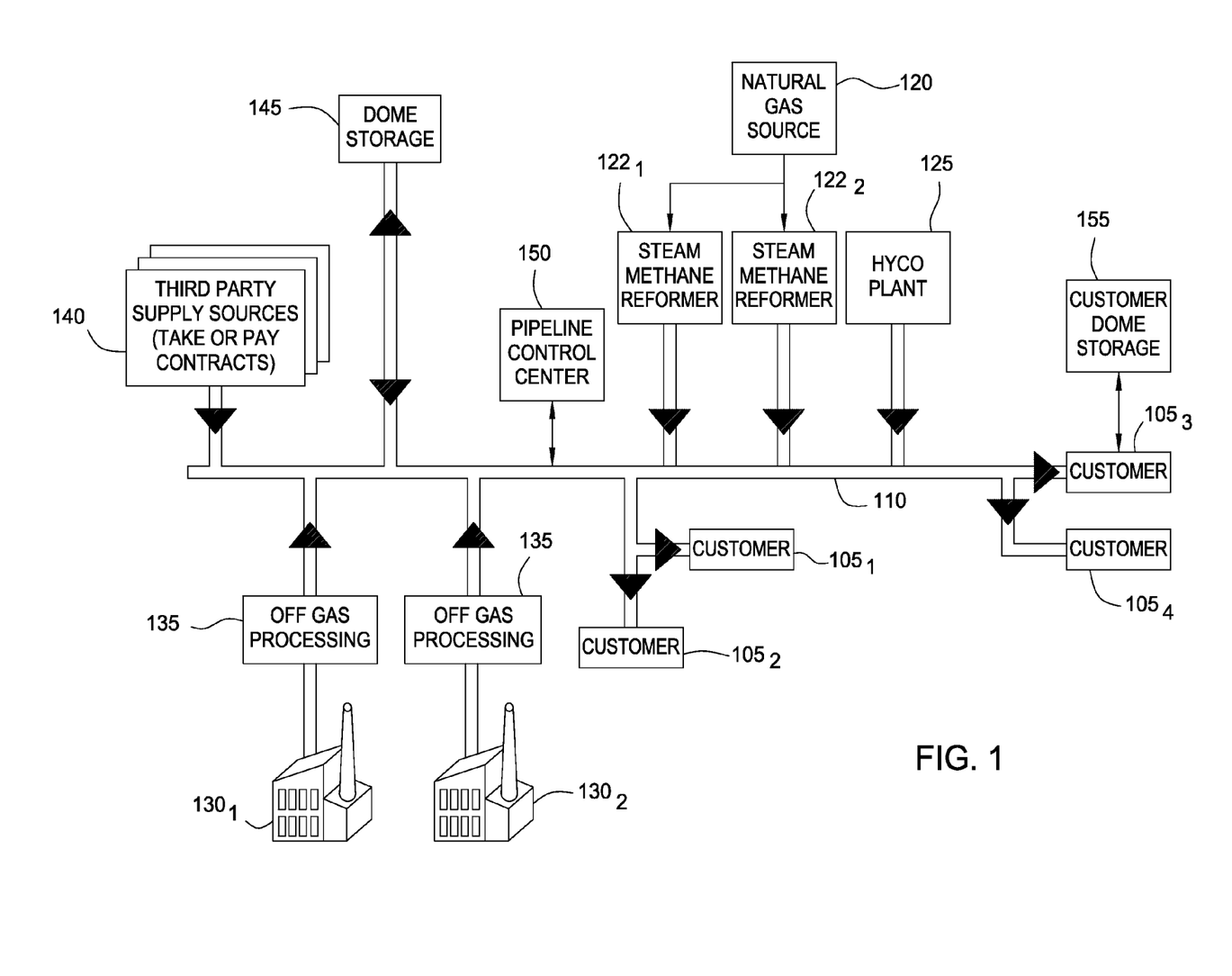
FIG. 1 is a block diagram illustrating components of a hydrogen pipeline system, according to one embodiment of the invention.

FIG. 1 is a block diagram illustrating components of a hydrogen pipeline network, 100 according to one embodiment of the invention. As shown, a hydrogen pipeline 110 connects a variety of different nodes, each of which may be able to introduce and/or draw hydrogen from the pipeline 110. Illustratively, the nodes connected to the pipeline 110 include customer nodes 105, steam methane reformer nodes 122, off-gas processing nodes 135, third party supply nodes 140, and dome storage 145.

The customer nodes $105_{1-4}$ are each connected to pipeline 110 and able to draw hydrogen from pipeline 110. Typically, the pipeline operator guarantees each customer $105_{1-4}$ with a minimum hydrogen pressure at their respective connections to the pipeline. Also customers $105_{1-4}$ may require (and contract for) different levels of hydrogen purity. The purity of a sample of hydrogen is a measure of the percentage of that sample that is hydrogen, by volume. Similarly, different sources of hydrogen introduced to the pipeline 110 may have different levels of purity. In one embodiment, the hydrogen optimizer system may be configured to evaluate a variety of various feasible pipeline configurations for supplying customer 105 with a required pressure, volume, or purity of hydrogen product.

Additionally (or alternatively), some customers (e.g., customer $105_3$) may draw hydrogen from a customer dome storage chamber 155 and the pipeline operator may be able to control when customer $105_3$ draws from their dome storage 155 or from pipeline 110, within contractual limits. In such a scenario, the hydrogen optimizer system may be configured to consider various options for supplying customer $105_3$ with a required pressure or volumes of hydrogen product that includes having customer $105_3$ drawing hydrogen from their own dome storage 155.

As shown, the pipeline system 110 includes a number of different types of hydrogen sources including, the steam methane reformer nodes 122, off-gas processing nodes 135, third party supply nodes 140, and dome storage 145, each of which may introduce hydrogen pressure into pipeline 110. As is known, a steam methane reformer 122, or "SMR", is a piece of equipment that produces hydrogen from a natural gas source 120 and water steam. Similarly, HyCo plant 125 represents a hydrogen-producing plant that can produce hydrogen or carbon monoxide, using a syngas process.

Another source of hydrogen in the pipeline 110 includes off-gas sources $130_{1-2}$. Some industrial processes produce hydrogen in varying amounts and purity as a byproduct. In such cases an off gas processing node 135 may provide an HPU plant used to extract hydrogen from what is otherwise considered just a waste-stream from off-gas sources $130_{1-2}$. An HPU plant is a hydrogen-producing plant that utilizes HPU equipment, takes hydrogen gas feeds as inputs, and produces hydrogen gas with higher purity and pressure. Generally, a feed refers to a source of gas for an HPU plant. A feed may input hydrogen, possibly with low levels of purity, or it may input another gas from which hydrogen can be extracted and purified. In addition to the hydrogen producing nodes, another source of hydrogen input to pipeline 110 may include hydrogen storage, e.g., dome storage 145, as well as third party supplies 140 of hydrogen, typically purchased under take-or-pay arrangements made between the pipeline operator and third party hydrogen producer.

FIG. 1 also shows a pipeline control center 150 which provides an operational control center used to monitor a variety of aspects of pipeline operations. In one embodiment, pipeline control center 150 may include a hydrogen optimizer system used to identify a feasible pipeline state that satisfies pressure and flow requirements while minimizing operational costs.

Figure 2:
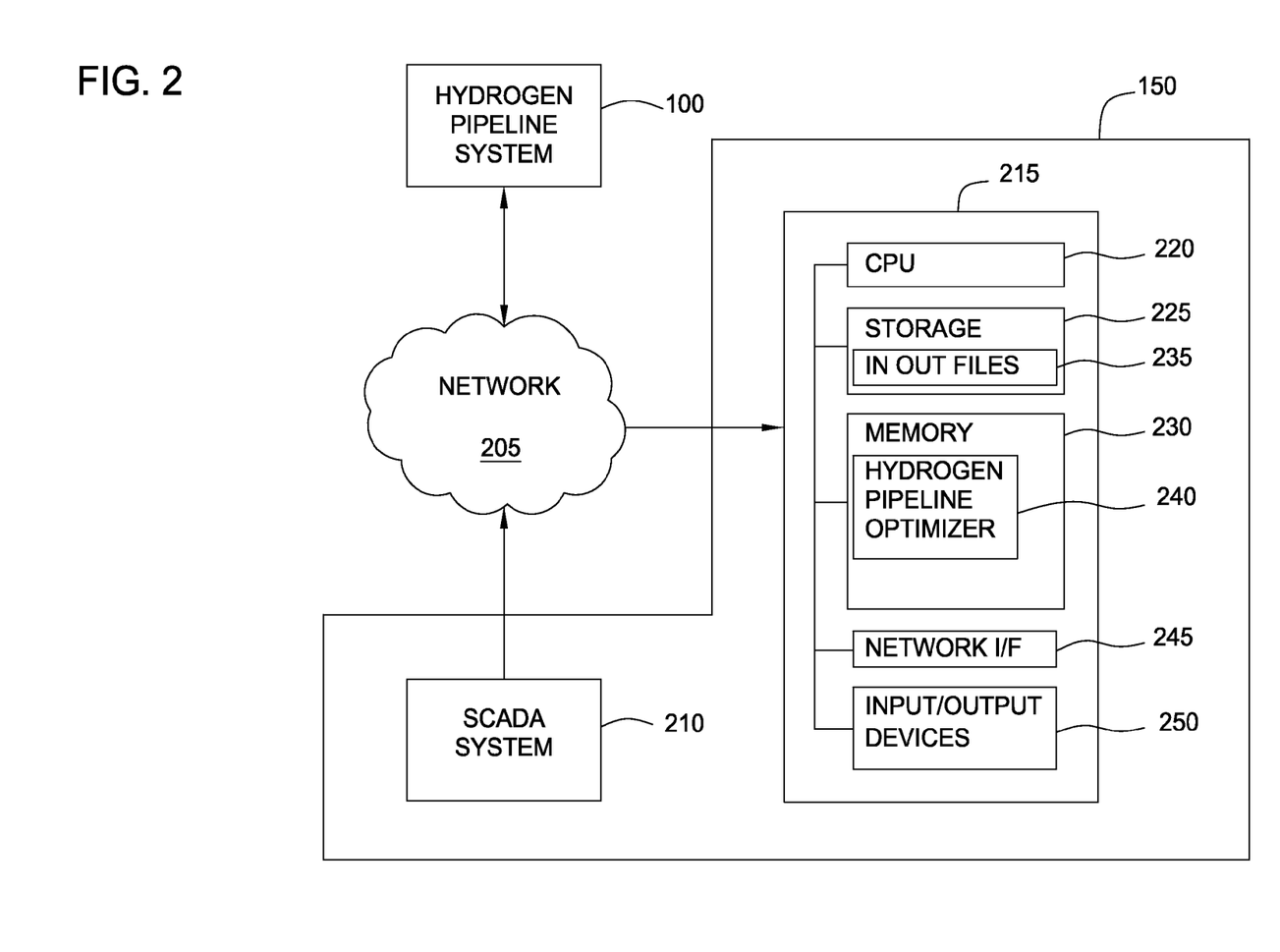
FIG. 2 illustrates components of a computer system used for optimizing operational aspects of the example hydrogen pipeline system shown in FIG. 1, according to one embodiment of the invention.

FIG. 2 illustrates components of a computer system 215 used for optimizing operational aspects of the hydrogen pipeline system 100 shown in FIG. 1, according to one embodiment of the invention. Computer system 215 may be part of pipeline control center 150. As shown, computer system 215 may communicate with a SCADA system 210 over a network 205. As is known, SCADA system 210 (short for System Control and Data Acquisition) provides a process control application that collects data from sensors regarding the operational state of the pipeline 110 and sends them to a central computer for management and control. In one embodiment, the operational state of the pipeline system 100 obtained from SCADA system 210 may be used as an input to the hydrogen optimizer system. For example, at the beginning of each shift, a hydrogen operator in the pipeline control center 150 may create files that describe the current state of the pipeline system 100. The optimizer runs using the input files and produces a solution. The solution may specify settings for plant production, pipeline state, etc., that satisfies operational constraints while minimizing operating costs. The operator reviews the solution and decides whether to implement it. Normally, the operator implements the solution. However, the operator may ignore the system's solution when the new solution would require substantial changes to the equipment settings in the plants and pipeline for a comparatively small amount of benefit.

Illustratively, computer system 215 includes a CPU, storage 225 (e.g., a hard disk drive or network storage volumes), and memory 230. Further, memory 230 includes a hydrogen pipeline optimizer program 240. As described herein, the hydrogen pipeline optimizer program 240 provides a software system that optimizes the production and distribution of hydrogen over hydrogen pipeline system 100. Computer system 215 also includes a network interface 245 used to connect computer system 215 to network 205 and input/output devices (e.g., a keyboard, mouse, and LCD or CRT display monitor). Of course, one of ordinary skill in the art will recognize that the computer system 215 illustrated in FIG. 2 is simplified in order to highlight aspects of the present invention.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

Figure 3:
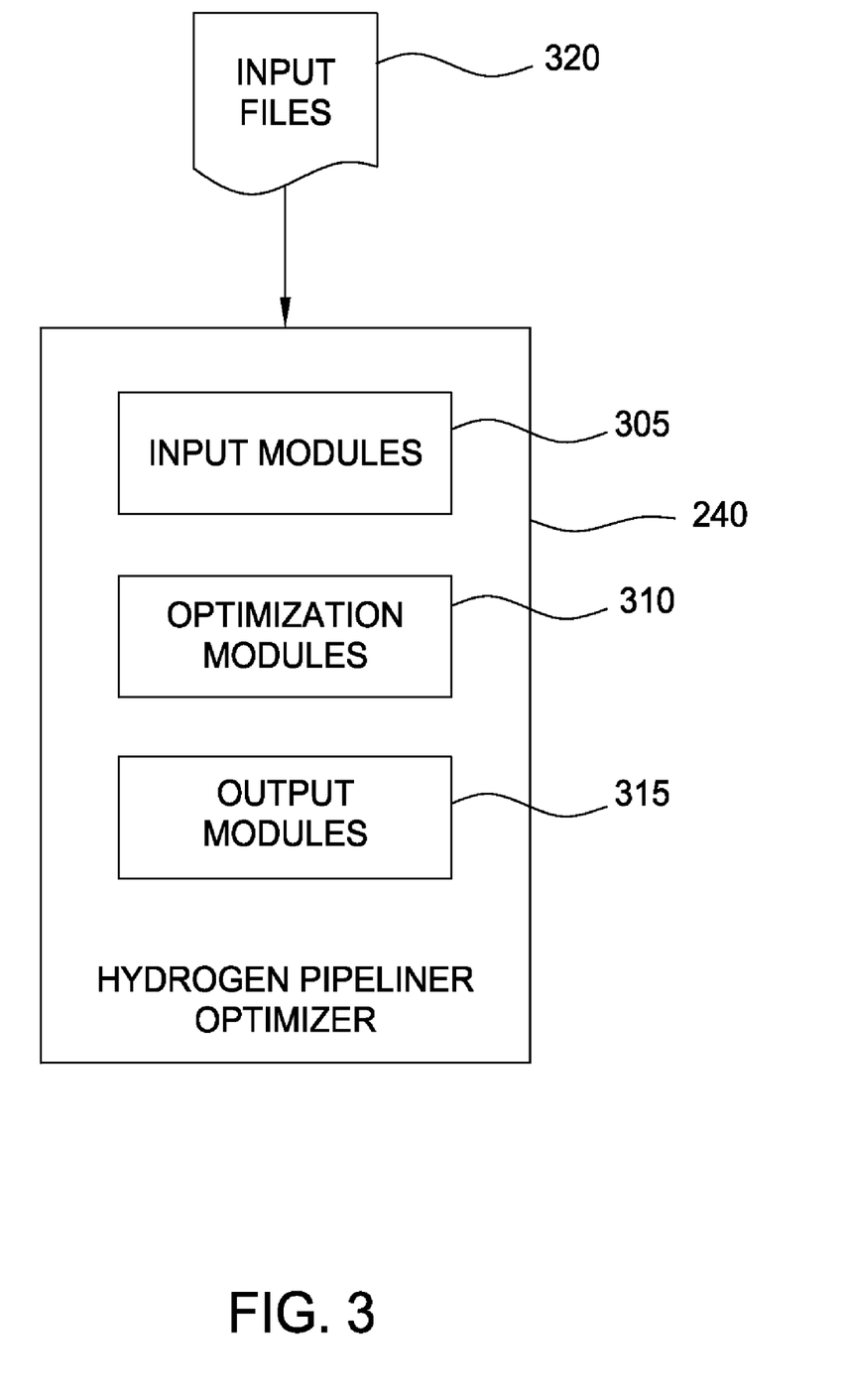
FIG. 3 illustrates components of a hydrogen pipeline optimization program configured to optimize operational aspects of a the example hydrogen pipeline system shown in FIG. 1, according to one embodiment of the invention.

FIG. 3 illustrates components of a hydrogen pipeline optimizer 240 configured to optimize operational aspects of the example hydrogen pipeline system 100 shown in FIG. 1, according to one embodiment of the invention. As shown, the hydrogen pipeline optimization program 240 includes input modules 305, optimization modules, 310 and output modules 315. Additionally, FIG. 3 illustrates input data files 320, which may be used to describe the pipeline components and the optimization parameters supplied to the hydrogen pipeline optimizer 240. In one embodiment, the input data files 320 may be composed using an XML grammar that describes a variety of elements that are part of hydrogen pipeline system 100. As is known, an XML file is a text file structured according to a specific grammar defined for transferring data between applications across platforms.

The input modules 305 may be configured to read in a description of the pipeline, plants, equipment, user requirements, user-provided preferences, and user configurations of the optimization algorithm included in input files 320. The input modules 305 may also read input files 320 describing the topology and status of the pipeline system 100, the constraints on pipeline operation, and the goals of a given optimization run. For example, the input files 320 may specify the length of an optimization run, the constraints that are to be maintained in providing solutions, and whether previously-generated solutions are to be read in and used during this optimization run.

In one embodiment, the input module 305 may also configured to perform a number of tests to validate the data for the current pipeline system being analyzed after the data input module has read the information in the input files 320. Such validation may include, for example, XML validation failures; node pressure min and max mismatches; mismatches between node names and pipeline element data; element data mismatch, e.g. an element has the same from and to nodes; pipeline errors, e.g., disconnected pipelines or two set points within one segment; and impossible optimization target, e.g., customer loads are greater than the sources can produce. If the input modules 305 detect a critical data validation failure (such as a problem that makes the XML files impossible to parse) then the system notes this fact in the user interface and halts operation. In the case of conditions that seem unusual but might be feasible, such as negative power costs, the system may be configured to send a warning to the user interface, writes a note to the run log file, and continue processing.

The optimization modules 310 may be configured to search for high-quality, feasible solutions to the problem read in from the input files 320. In one embodiment, the optimization modules 310 may be configured to perform a genetic algorithm to search for an "optimal" solution for operating hydrogen pipeline system 100. A genetic algorithm optimizes a solution to a pipeline state by simulating an evolutionarily processes using a large population of candidate solutions. Typically, the genetic algorithm "evolves" the population of solutions to produce better and better solutions by cross-breeding them, mutating them, and giving more "child-producing" opportunities to the better members of the population than to the worse ones. The operations of optimization modules 310 are described in greater detail below in conjunction with FIGS. 6-7.

The output modules 315 may be configured to generate a number of reports to the user and writes log files that describe the results of a given optimization run, i.e., the results produced by the optimization modules 310 for a given set of input files 320. For example, the output module 320 may be configured to generate an XML file describing the best solution and its evaluation; generate an "Analyst's Summary" text file describing the run—how much time it took, what its optimization parameters were, what are the pipeline segments, etc; generate a report describing any unusual conditions or suspected data errors that occurred during the optimization run.

Figure 4:
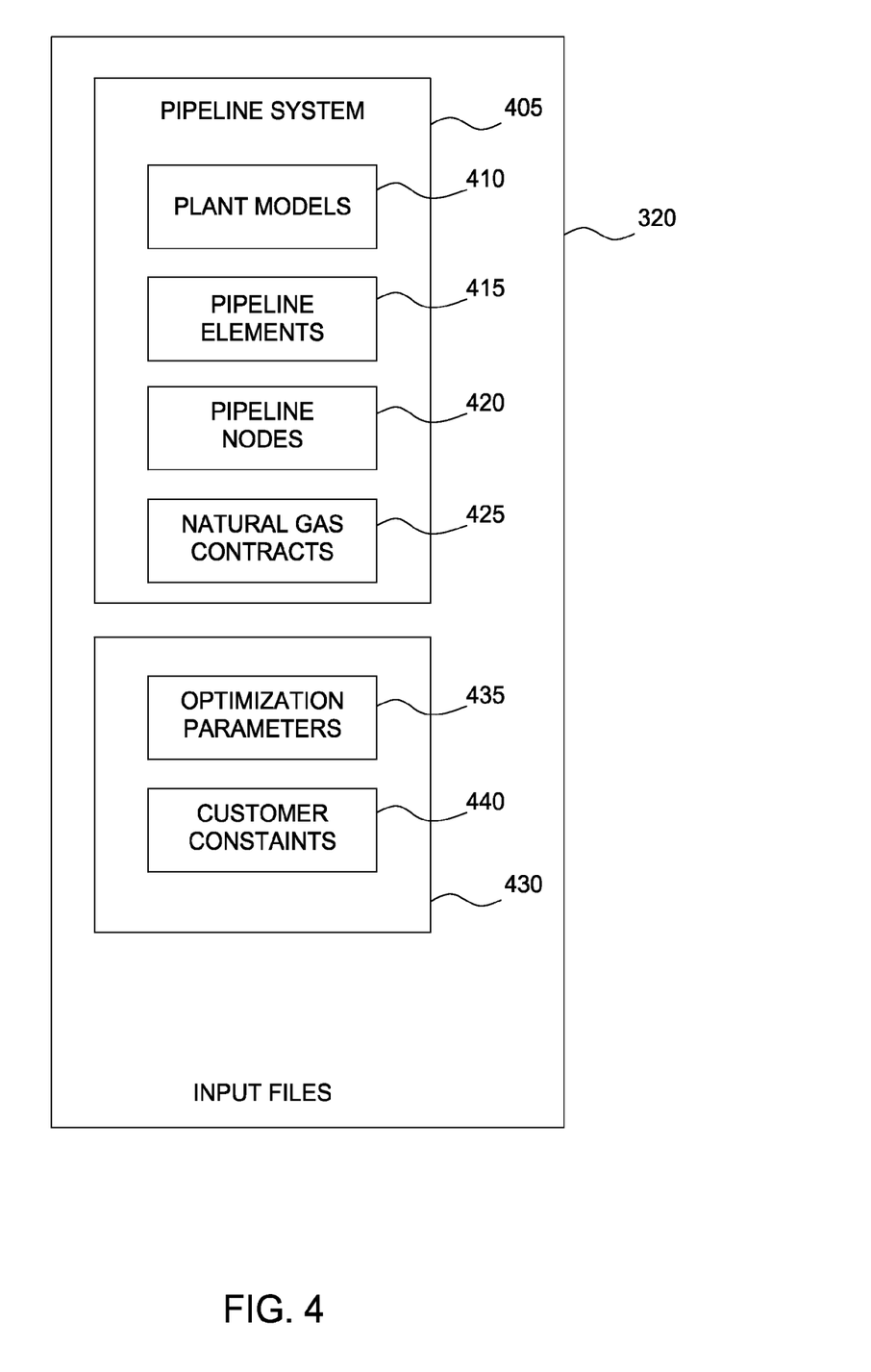
FIG. 4 illustrates an example of an input file used to describe the configuration of a hydrogen pipeline system and optimization parameters, according to one embodiment of the invention.
Figure 5A:
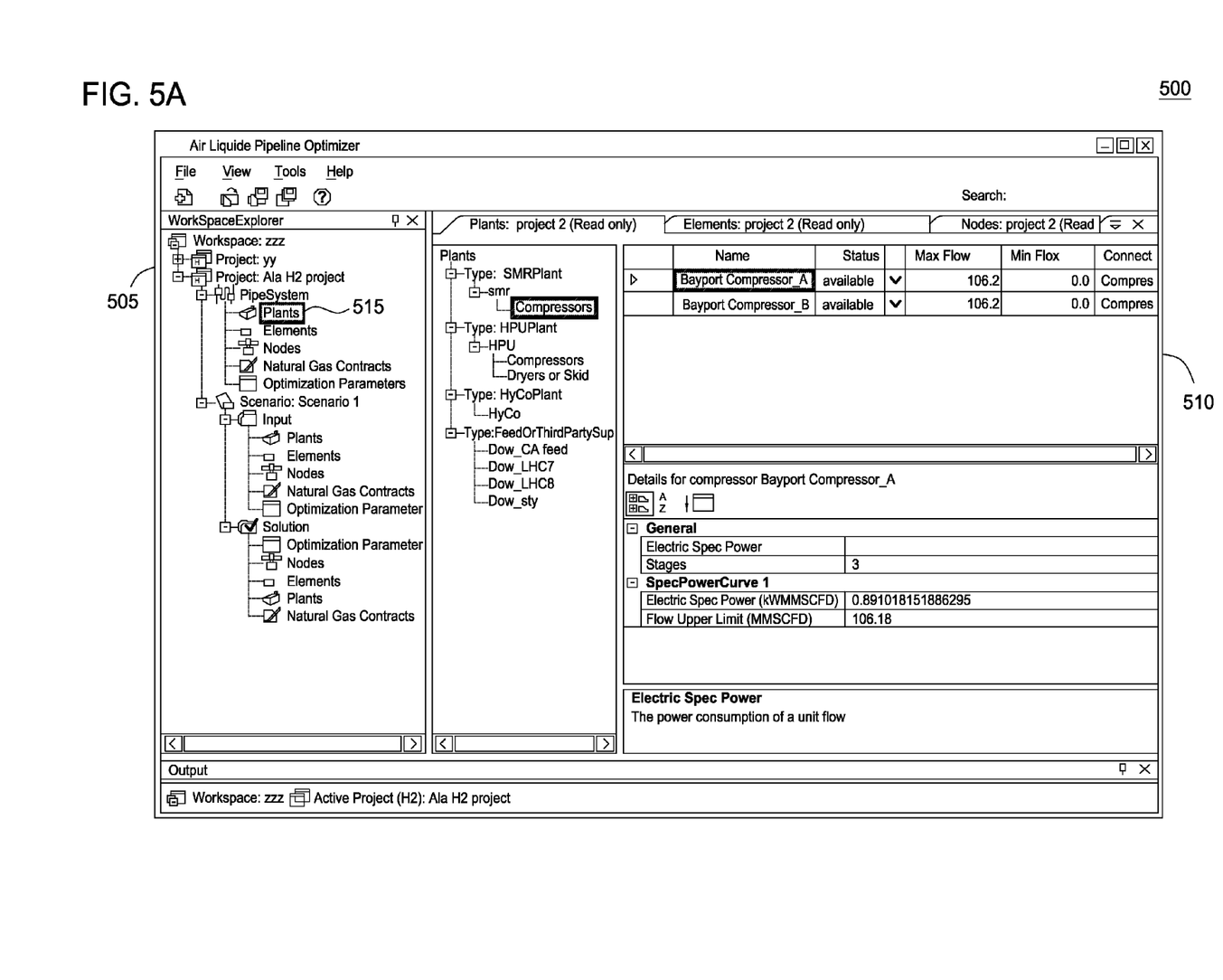
FIGS. 5A-5B illustrate an example graphical user interface provided by the computer system shown in FIG. 2, according to one embodiment of the invention.
Figure 5B:
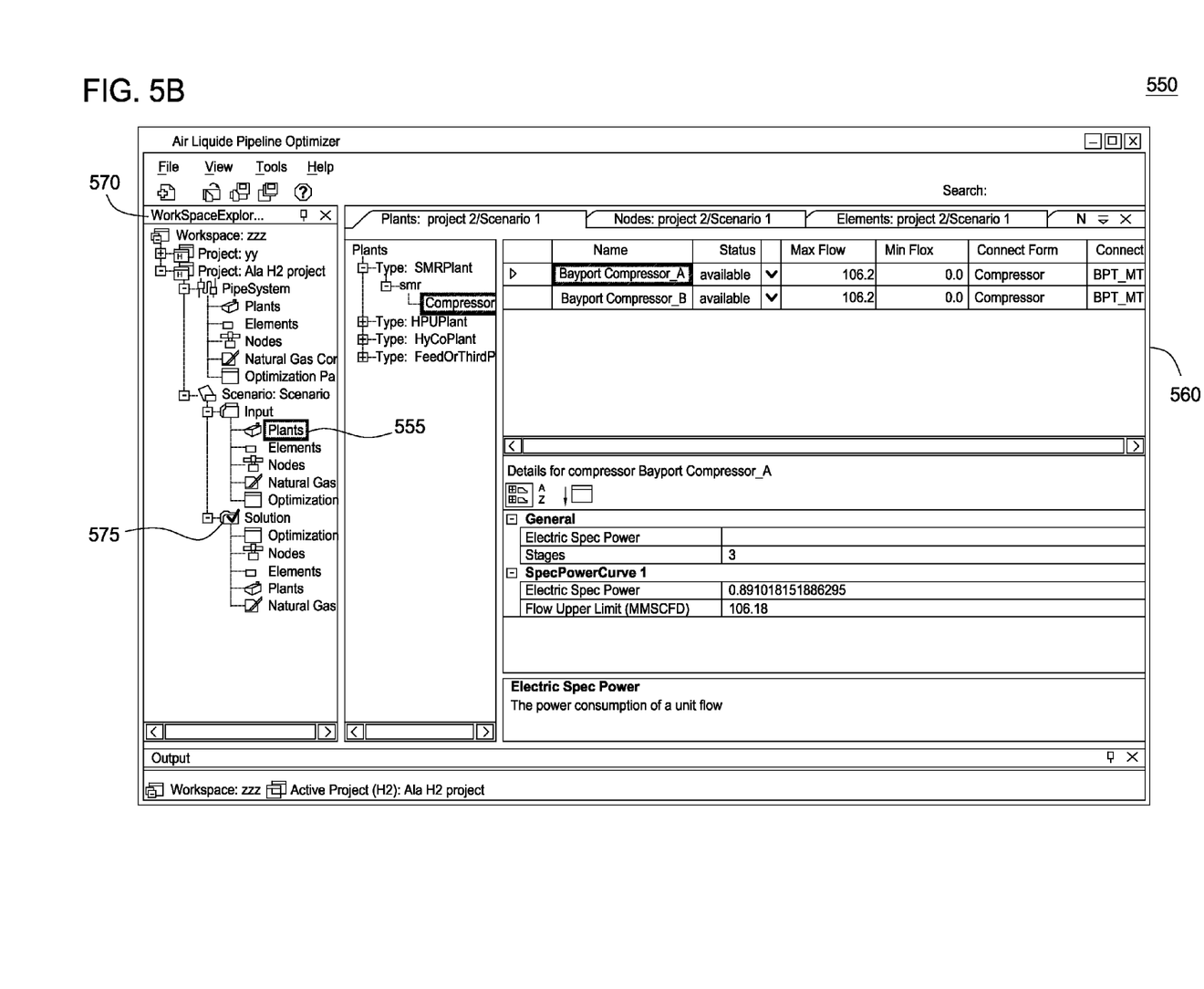

FIG. 4 illustrates an example of the input file 320 used to describe the configuration of a hydrogen pipeline system 100 and optimization parameters, according to one embodiment of the invention. As shown, the input files 320 may include pipeline system file 405 and an optimization parameter file 430. The pipeline system file 405 may be used to describe the physical structure and properties of pipeline system 100. Illustratively, the pipeline system file 405 includes a plant modules component 410, a pipeline elements component 415, a pipeline nodes component 420, and a natural gas contracts component 425. The optimization parameter file 430 also includes an optimization parameters component 435 and a customer constraints component 440. The components 410-425 and 435-440 may be used to provide the optimization module 310 with a description of the pipeline system to be optimized. For example, FIGS. 5A-5B illustrate a graphical user interface displaying the contents of an example set of input files shown 320, according to one embodiment of the invention. First, FIG. 5A shows a GUI screen 500 that displays the contents of the plant modules component 410. In this example, a workspace area 505 allows the user to navigate through components 410-425 and 435-440 to review the content of input files 320. Illustratively, the plants component 515 of the workspace 505 is selected. As a result, the pane 510 shows a list of plants that is included in the input files 320, organized by plant type. In this case, an SMR (steam methane reformer) is selected and pane 510 shows details related to this particular piece of pipeline equipment.

FIG. 5B shows a GUI screen 550 used for editing an optimization scenario. A scenario allows users to view the pipeline system 100 through a series of editors where users can make changes to parameters supplied to the optimization modules 310. Each scenario specifies a complete operational environment for the pipeline system 100 to be optimized during an optimization run. For example, detail pane 560 shows the parameters of an SMR compressor that may be modified for a given optimization run. In this specific example, both a "Compressor_A" and a "Compressor_B" have a status set to "available." In one embodiment, the parameters for a given scenario may be taken from the SCADA system. That is, the optimization parameters may be based on the then "live" state of the pipeline system 100. In such a case, what production facilities are available, what current electricity costs are prevailing, what take-or-pay contracts have been entered, etc., may all be incorporated into a given scenario. Once complete, users can also send a scenario to the optimizer. When the optimizer has finished running, it may be configured to load the solution into the editor and allow the user to review the settings for the best solution found during the optimization run. For example, workspace explorer 570 includes a solution folder 575 that allows the user to review the settings for each of the optimization parameters, nodes, elements, plants, and natural gas contracts that are part of a given solution.

Figure 6:
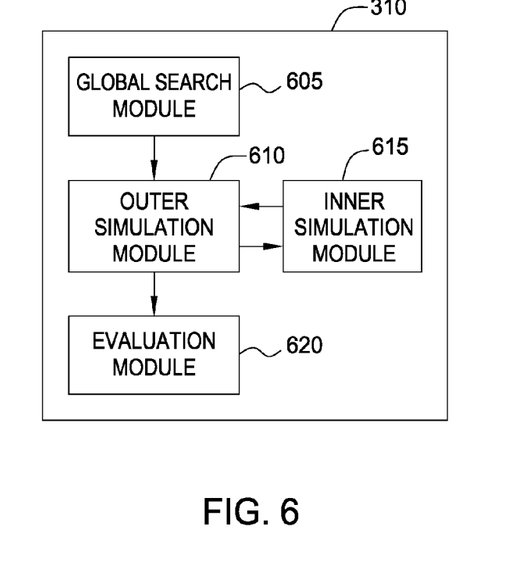
FIG. 6 illustrates components of the optimization module of the hydrogen pipeline optimization program, according to one embodiment of the invention.

FIG. 6 illustrates components of the optimization module 310 of the hydrogen pipeline optimization program 320, according to one embodiment of the invention. As shown, the optimization module 310 includes a global search module 605, an outer simulation module 610, an inner simulation module 615, and a solution evaluation module 620. The global search module 605 provides a component of the optimization modules configured to drive the search for feasible solutions of sufficient quality, to the problem described by the input files.

In one embodiment, the global search module may perform a genetic algorithm configured to "evolve" a population of solutions to improve the quality of solutions over time. As new solutions are generated, the outer simulation module 610 and inner simulation module 615 may be configured to simulate the operations of the pipeline system using the settings in a given solution. For example outer simulation module 610 may simulate hydraulic flows throughout the pipeline, based on the settings in a given solution. If there are any flow violations, the simulation terminates, relative to the current solution. That is, a flow violation renders a solution infeasible and, thus, such a solution may be discarded without further processing. Otherwise, if the flow propagation simulation indicates that a solution does not include any flow violations, then the solution may be passed to the inner simulation module 615. In one embodiment the inner simulation module 615 may be configured to optimize the pressures in the pipeline determined during the flow propagation simulation performed by the outer simulation module 610, possibly changing some of the pressures of some of the components of the pipeline using a direct pressure optimization technique. The direct pressure optimization technique may be configured to set pressures in a loop that is a part of a pipeline. As is known, if the output pressure for the loop is known, the pressures of the other nodes can be computed directly rather than being found by an optimization algorithm. Because direct computation of the pressure may be faster than using an optimizing algorithm, the use of direct pressure optimization technique may decrease the amount of optimization required by the global search module 605, and thus decreases dramatically the time required for the global search module 605 to run. Further the direct pressure optimization technique may also improve solution quality by guaranteeing the minimal pressure possible for the whole pipeline. The direct pressure optimization technique is based on the fact that the optimization task can be simplified if the global genetic algorithm specifies flows and the allocation of flows through loops, while the direct pressure optimization technique approach is used to optimize pressures once flows are allocated for a given feasible solution.

After the simulation phase performed by simulation modules 610 and 615, provided a solution determined to be feasible, the solution evaluation module 620 may be configured to evaluate the quality of a feasible solution. In one embodiment, the evaluation of the simulated hydrogen network derived from a solution centers on the estimated cost of operating the simulated pipeline and the simulated plants. And the cost of operations may be calculated as a sum of the operating cost for each of the components of the pipeline and the cost of the plants and their equipment.

Figure 7:
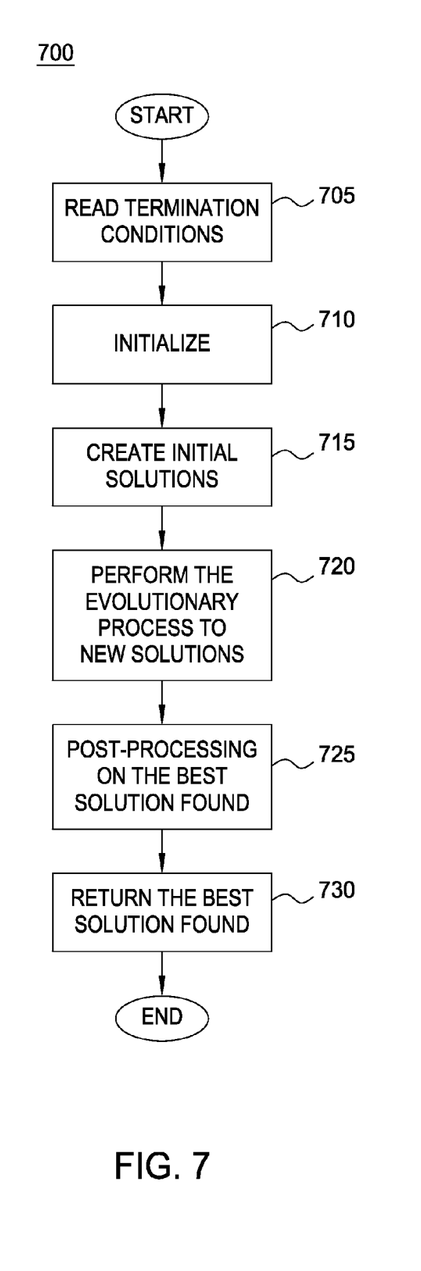
FIG. 7 is a flow diagram illustrating a method for optimizing the operations of a hydrogen pipeline system, according to one embodiment of the invention.

FIG. 7 is a flow diagram illustrating a method 700 for optimizing the operations of a hydrogen pipeline system, according to one embodiment of the invention. As shown, the method 700 begins at step 705 where the global search module 605 identifies a set of termination conditions for a given optimization run. Generally, the termination conditions indicate when the optimization module should stop "evolving" the population of solutions and output the best solution generated thus far. To read termination conditions, the global search module 605 checks the input data created by the input modules 305. In one embodiment, the user may specify one or more conditions for termination in the input files 320. If more than one termination condition is specified, the global search module 605 terminates when any of them is satisfied. Examples of possible termination conditions include a maximum number of solutions generated, maximum cock time, and solution quality. If the maximum number of solutions generated condition is activated, the global search module 605 terminates when it has generated and evaluated the specified number of solutions. If the maximum amount of clock time spent condition is activated, the global search module 605 will terminate when it has expended this amount of clock time in optimization. If the solution quality condition is activated, the global search module 605 will terminate when it is unable to improve the solution quality after some given number of iterations, or until a solution with a specified quality is found, e.g., a solution with a lowest operational cost, complexity, feasibility, and the like. The standard of improvement can also be specified by the input files 320. Additionally, the user may manually halt an optimization run at certain points during an optimization run.

At step 710, the global search module 605 may initialize an optimization run. To initialize, the global search module 605 generates internal structures needed to support the optimization run, initializes any solution modification procedures that require initialization, and stores information for heuristic procedures such as an analysis of pipeline topology used to improve a solution generated during the evolutionary simulation. At step 715, the global search module 605 may create an initial population of solutions. In one embodiment, the global search module 605 may create zero or more seed solutions and also create a number of initial, randomly-generated solutions to create the initial solution population. Typically, a user specifies a seed solution placed into the initial population subsequently evolved by the genetic algorithm. Seed solutions may be input by the user, taken from data files, or created heuristically (e.g., based on expert knowledge). Providing the global search module 605 access to a very good seed solution from the start may speed up optimization, but it may also bias the optimization solution toward the seed solution and away from other, potentially better, areas of the solution search space.

Further, in one embodiment, the global search module 605 may create "smart seeds," based on prior solutions or on solution generation heuristics similar to those a human might use. The smart seeds may include the solution generated in the prior run of the system. Including the prior solution output by the prior optimization run may be useful or detrimental. If the pipeline conditions and the optimization requirements are identical to those in a prior optimization run, the optimization process could be shortened considerably, assuming the prior solution was optimal or nearly so. On the other hand, including the prior solution in the initial population could bias the current run in a direction that is suboptimal, if pipeline conditions have changed, because its superior evaluation and its finely-tuned properties may cause it to drive out other, less well developed, solutions before they have a chance to adapt to the current problem. Because it can be useful to include the prior solution in an optimization run, and because it can be useful to omit it, in one embodiment, the global search module 605 may perform two parallel optimization runs using different random seeds—one with the prior solution included in the population, and one without. In such a case, the solutions from each parallel optimization run may be compared against one another and the best solution between the two output as a final solution in the optimization process.

In addition to seeding the solution population with the solution generated in prior runs, any seed solutions in the input files 320 are included in the seed population. For example, the user may want to provide sample solutions to the optimization process that are different from the currently identified solution. For example, a database of solutions to prior problems may be built up over time, and if a matching algorithm is used to match the current state of the pipeline and its requirements to prior states, then it would be reasonable to seed the current population with the solution to one or more prior states that are similar to the current state.

The initial population of solutions may also include randomly generated solutions. Accordingly, in one embodiment, the global search module 605 may generate multiple, random solutions that satisfy the constraints of the problem, in order to fill up a population of solutions for use by the optimizer. This population of solutions provides much of the diversity that allows the optimizer to explore the wide range of solutions at the start of the optimization process.

At step 720, the global search module 605 may simulate the evolutionary process using a genetic algorithm to produce new solutions. As stated, a genetic algorithm is an optimization technique that is sometimes characterized as "revolution on a computer". A genetic algorithm maintains a population of solutions and generates new solutions from old ones by processes of "mutation" and "cross-breeding". The best individuals found are likely to produce more offspring than the worst ones, and so the population of solutions tends to get better and better as the algorithm proceeds. The objective function (i.e., the problem that the genetic algorithm is solving) is to minimize the sum of the operating costs for each element in the hydrogen network, including plants. The operating cost for a solution includes the sum of costs for all plants, compressors, boosters, and so forth. In one embodiment, the final score from the objective function is the real operating cost, given that the solution is feasible (i.e., that the solution does not violate any hard constraints). The operations performed at step 720 are described below in conjunction with FIG. 8.

Further, in one embodiment, each solution may be generated as a concatenation of two lists. First, a list of plant production flows, with one or two output flows for each plant, depending on its type and second, a list of node pressures for pipeline loop nodes. These pressures do not necessarily impact the cost of a solution, but may impact the feasibility of the solution. Thus, each solution, with its list of plant production flows and node pressures, contains all the variables that are under the control of the optimizer, and setting the values of these variables is the goal of the optimization process. The list of plant flows, for example, may provide a list of one or two output flows for each plant under the control of the optimizer, each providing a hydrogen pressure for the hydrogen flows of a respective plant for that solution. The plant flow list does not typically include the flow for any plant whose flow has been fixed as a hard flow value by the user as these flow values are not determined as part of the optimization process. The global search module 605 creates, modifies, and preserves solution structures of this form, returning the best one it has found when the algorithm terminates.

After having reached one of the termination conditions specified at step 705, the global search module 605 has generated and evolved many generations of solutions. At step 725, one more heuristics may be executed in order to improve the best solution. That is, at 725, the solution may be spot checked for various conditions with known modifications that improve the overall quality of that solution. Generally, a heuristic provides a "rule of thumb" that often works well. Heuristics are generally based on prior experience. An example of a heuristic used in the hydrogen pipeline optimizer is "If the pressure in a region of the pipeline is neither at the maximum nor minimum pressure then consider raising or lowering the pressure, if this lowers cost and improves performance in adjacent regions of the pipeline." At step 730, the best solution (as potentially modified by one or more heuristics) is returned as the result of the optimization run.

Figure 8:
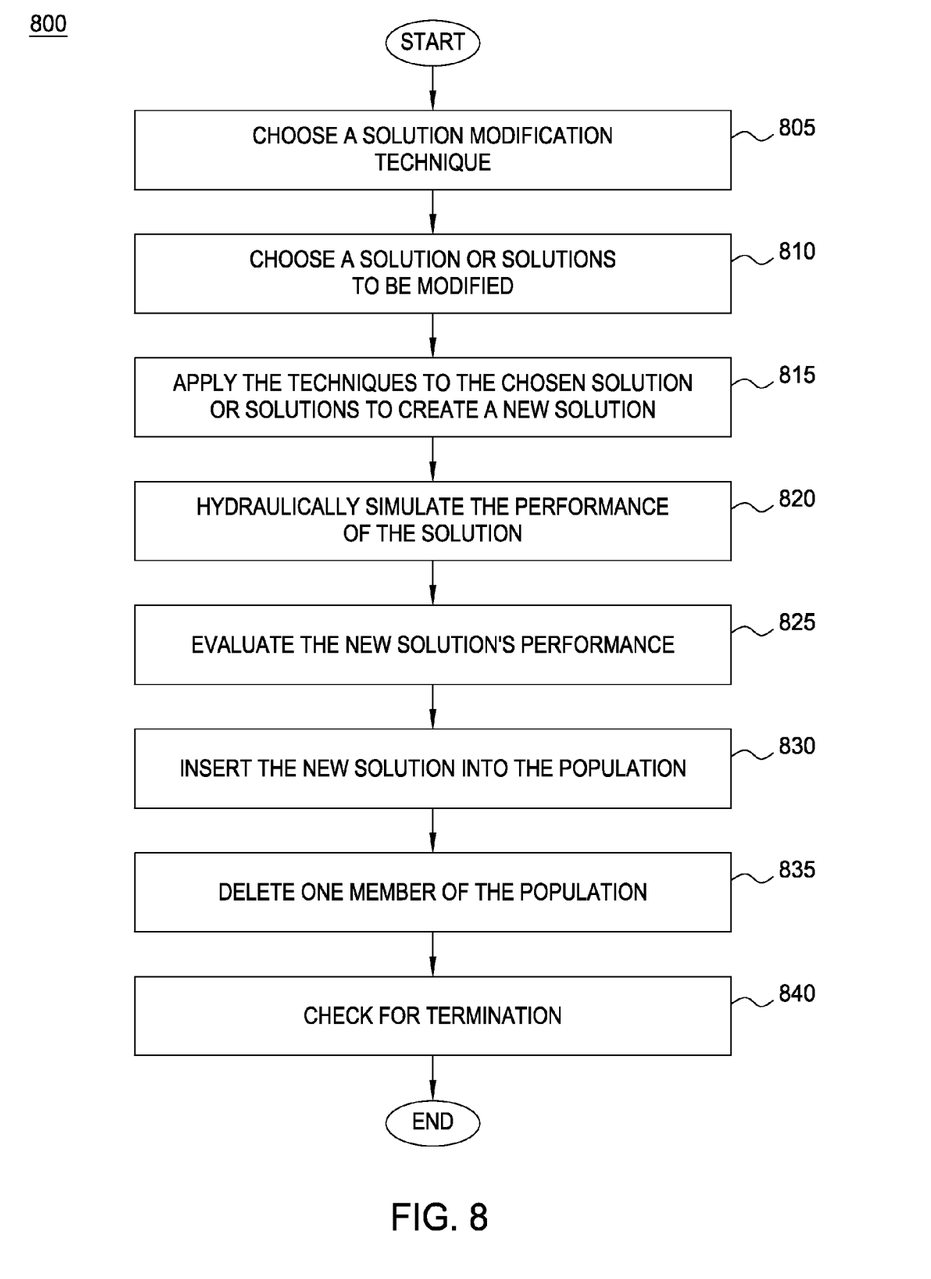
FIG. 8 illustrates a method for simulating an evolutionary process in order to optimize the operations of a hydrogen pipeline, according to one embodiment of the invention.

FIG. 8 illustrates a method 800 for simulating an evolutionary process in order to optimize the operations of a hydrogen pipeline, according to one embodiment of the invention. Method 800 illustrates a cycle of behavior of the optimization algorithm that is repeated again and again—often tens of thousands of times in a standard run—to find a high-performance solution to a pipeline optimization problem. As described above, the global search module is seeded with an initial population of solutions. At step 805, the global search module selects a solution modification technique used to modify one of the solutions in the population. For example, the modification technique may modify some small percentage of pressures in a solution. However, searching for better solutions with random changes may not be as fast or effective as searching with directed heuristics, at the same time, the heuristics may bias the population to evolve in a given direction, while ignoring other potentially superior evolution paths. Accordingly, in one embodiment, the global search module 605 may include both non-heuristic (i.e., random) and heuristic (i.e., non-random) ways to modify solutions. Examples of solution modification techniques include the following:

Random Change. This approach applies a random mutation to one parameter in a solution.

Flow Swapping. This approach moves flow from a plant where it is expensive to a plant where it is cheaper. This modifier involves increasing production at a less expensive plant and decreasing production at a more expensive plant. The flow swapping modifier takes into account current production prices and the sub-network structure of the pipeline. If this information were not taken into account when generating candidates for shifting production, then the modifier might shift flow from inexpensive production facilities to more expensive ones—a shift highly likely to increase overall production costs.

Cross-Breed Two Solutions. This approach selects two solutions and creates a new solution by cross-breeding the two original solutions. The different parts of the two original solutions are combined to create the new solution. For example, the list of parameter values in the two solutions can be used to determine, field by field, which of the two original solutions contributes its value to the new solution. In this way, solutions combine to generate new solutions that may bring together beneficial features of the two original solutions.

One advantage to using a number of techniques to modify solutions, as opposed to techniques where a single heuristic is applied again and again until it can achieve no more improvements, is that any of these solution modification techniques has a chance of being selected in any pass through a given cycle of optimization, and thus, there is no reliance on a single technique. Instead, there is a population of different solutions, any of which can have any modification technique applied to it to attempt to improve it. The ability of the global search module 605 to consider hundreds of thousands of these applications, coupled with the inclusion of expert human heuristics in the set of modification techniques that may be applied, leads to a very powerful search of the space of possible solutions, and yields convergence on high-performance solutions, without being unduly biased by any given heuristic, according to at least some embodiments.

Note, in one embodiment the global search module 605 may choose one of these modifiers probabilistically. To this end, probabilities to be used may be set either by using default values included in the system or set by the user through input files, if the user wishes to override the default values. Although any modifier has a chance of being chosen, some of them have higher probabilities of being chosen than others. Setting the probabilities is a matter of experiment and analysis of the types of solutions the optimizer produces.

At step 810, the global search module 605, selects one or more solutions from the population for modification. Once a modification technique has been selected at step 805, the global search module 605 may determine whether the selected modification technique requires one or two solutions as inputs. Most modifications require only one, but the cross-breeding technique, for example, requires two.

In one embodiment, the solutions chosen to be modified may be chosen from the general population of solutions using a technique sometimes called a ranked roulette wheel technique. The technique is described as "ranked" because it sorts the solutions in the population of solutions into a list, ordered from best solution to worst. It then assigns a weight to each solution in the list, according to the ranking. That is, solutions with a better score of "fitness" are ranked higher than solutions with a lower score of "fitness." These weights decrease linearly. For example, with a decrease rate of 10 and a start weight of 100, the first 12 members of the population would have weights of 100, 90, 80, 70, 60, 50, 40, 30, 20, 10, 1, 1, . . . . These weights are used to bias the selection process so that the best individuals are more likely to be chosen than the worst ones. The analogy is one of a roulette wheel with a slot for each member of the population. The slots are not of equal size however; instead, each solution's slot is proportional to its weight, calculated as above.

Set up this way, a computerized "ball" is spun, and the individual in whose slot the ball lands is chosen. The best individual in the population, with a weight and slot size of 100, is 100 times more likely to be chosen when a solution is required than the worst individual, with a weight and slot size of 1.

At step 815, the solution chosen is cloned to create a new solution identical to the original solution. The modification procedure is then applied to the new solution so that it is a modified version of the original solution. Some of the modifications are very small—change pressure a bit at one location in the pipeline, for example. Some are more significant—move flow from one plant to another, for example. The solution is cloned so that both it and its "parent" can be maintained in the population. If the modification is a good one, it is likely that the parent will eventually be eliminated from the population while the new solution and its descendants are included in the population. If the modification produces a bad solution, then the new solution is likely to be eliminated from the population, while the original solution is retained and has the potential to be modified to create other new solutions. At step 820, the simulation modules 610 and 615 may simulate, the performance of the hydrogen pipeline using the cloned, modified solution generated at step 815. Additionally, as described above, the simulation modules 610 and 615 may further optimize the solution using a direct pressure optimization technique.

At step 825, the evaluation module 620 may evaluate the new solution's performance. As sated, the evaluation of the simulated hydrogen network derived from a solution centers on the cost of operations of the simulated pipeline and the simulated plants. And the cost of operations is the sum of the operating cost for each of the components of the pipeline, and the cost of the plants and their equipment. At step 830, the new solution (if feasible) and its evaluation score produced by the evaluation module 620 may be inserted into the population. In one embodiment, the population is maintained in sorted order, so the new solution is placed according to its evaluation score.

At step 835, the global search module 605 may delete a member of the population so that the size of the population stays constant in each cycle of the optimization process. In one embodiment, the member is chosen through a roulette wheel selection process, using the inverse of each population member's rank evaluation, making it highly likely, but not guaranteed, that the poorest scoring member of the population is deleted each cycle. At step 640, the global search module 605 may determine whether any termination conditions have been satisfied. If so, the method 800 terminates and returns to step 725 of method 700. If not, another generation of the evolutionary process is performed.

Figure 9:
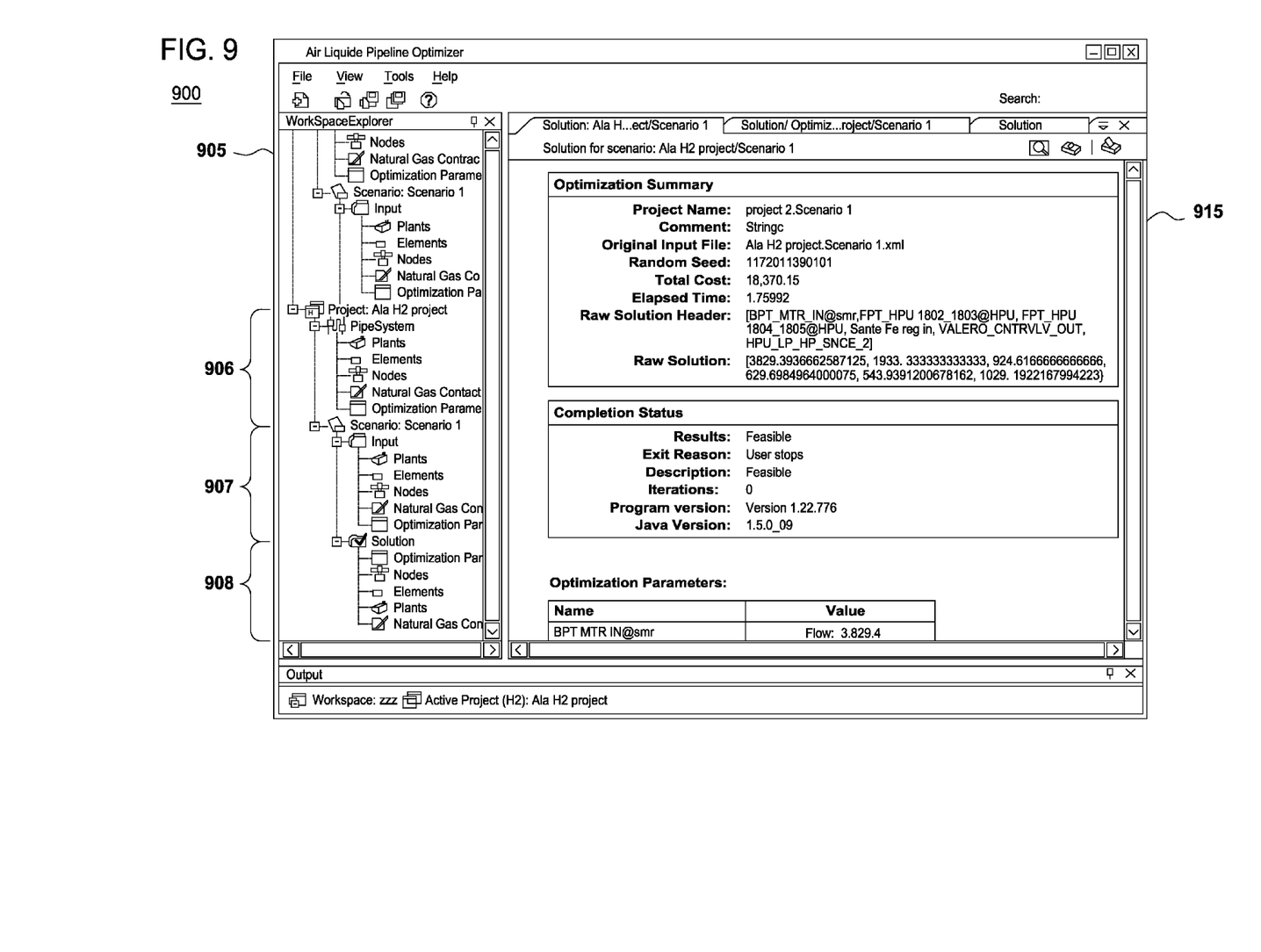
FIG. 9 illustrates an example graphical user interface provided by the computer system shown in FIG. 2, according to one embodiment of the invention.

FIG. 9 illustrate an example graphical user interface 900 provided by the hydrogen pipeline optimizer 240 shown in FIG. 2, according to one embodiment of the invention. Graphical user interface 900 shows the results presented to a user after an optimization run is completed. As shown, graphical user interface 900 includes a workspace explorer 905 that allows the user to browse the structure of the pipeline system that was the subject of the operation run using the project tab 906; the editable parameters used as part of the optimization run using scenario tab 907; and the solution generated by the global search module while performing the operations described above using the solution tab 908. Illustratively, the solution tab 908 is highlighted and a detail pane 915 presents elements of the solution identified during the optimization run.

Example System Walkthrough

In one embodiment, the optimization system 200 proceeds through the following steps in order to solve a pipeline optimization problem. The following walkthrough generally corresponds to the methods illustrated in FIGS. 6-8, using the inputs and modules illustrated in FIGS. 2-5:
1. The input files 320 required in order for the system to function are prepared, either by the user through editing the input files, by the user through the GUI, or by creating the required files by accessing a SCADA database.
2. The input module 305 reads data from the input files 320 and creates the required structures in software to hold the data that is read in.
3. The input module 305 validates the input data files, creating a log of any potentially incorrect data.
4. The input module 305 performs initialization functions—analyzing the connectivity of the network, creating subnetworks, and so forth.
5. The global search module 605 reads its termination conditions.
6. The global search module 605 initializes the structures it will use during the optimization process.
7. The global search module 605 creates an initial set of solutions, e.g., using the seed solution generation and random solution generation procedures.
8. The global search module 605 simulates and evaluates each of the solutions in its initial solution set.
9. The global search module repeats 605 the inner sequence of steps until its termination criterion is met:
   a. The global search module 605 chooses a solution modification technique.
   b. The global search module 605 chooses as many solutions as are required by the solution modification technique—either one or two, for this system.
   c. The global search module 605 creates a new solution by copying the existing solutions.
   d. The global search module 605 applies the modification technique to the new solution.
   e. The global search module 605 evaluates the new solution's performance and associates this evaluation with the new solution.
   f. The new solution 605 is inserted into the population.
   g. The worst solution 605 in the population is deleted.
   h. The global search module 605 checks to see whether it should terminate. If so, the system goes to the final stage of the process. If not, the system goes back to step a and executes the inner loop sequence again.
10. If the optimization process has terminated, the global search module 605 finds the best solution it has found.
11. The global search module 605 applies any post-processing flow swapping heuristics to the best solution found.
12. The output module generates reports describing the system run, the best solution found, and other interesting features of the run.

Advantageously, embodiments of the invention use a genetic algorithm—a type of global search technique—in conjunction with heuristics derived from real-life hydrogen pipeline control experts, to find high-quality solutions quickly. Further, because the hydrogen pipeline optimizer program 240 uses files as its specification of the problem to be solved, it is possible for the user to create a wide variety of input files 320 describing scenarios similar to as well as quite different from a current operating environment. For example, among other things, a user may study of the benefits obtainable by upgrading equipment. One use of the hydrogen pipeline optimizer program 240 would be an off-line optimization run using some description of typical loads or projected loads on the hydrogen pipeline, and including one or more modifications to the input files reflecting equipment changes. The difference in pipeline operating costs with and without the equipment changes would provide a user with an indication of the cost-benefit tradeoff involved in upgrading the equipment.

Similarly, a pipeline operator may study of the costs of adding a new customer. Another simple use of the hydrogen pipeline optimizer program 240 would be its modification to reflect a new customer—either as a single point at which flow leaves the hydrogen pipeline, or with some additions to the structure of the pipeline itself. The difference in pipeline operating costs with and without the new customer provides an assessment of the value of the customer, given the pipeline's current and projected loads and equipment.

Still another use of the hydrogen pipeline optimizer program 240 includes the study of the benefits of adding a new facility. A more complicated use of the hydrogen pipeline optimizer program 240 would be to change the pipeline and plant description files to reflect the addition of a new facility—a new plant, for instance—to the pipeline. The difference in pipeline operating costs and its ability to handle customer loads with and without the new facility would provide strategic planners with an indication of the value of the new facility.

As described herein, embodiments of the invention provide a computerized optimization system configured to optimize the operations of a hydrogen generation, processing, and delivery network. Such a network typically includes a complex of physical equipment, plants, and pipelines, including both production and distribution facilities. A hydrogen optimization system provides a software system that optimizes the production and distribution of hydrogen over such a hydrogen network. The hydrogen optimization system may use both a genetic algorithm configured to "evolve" a population of solutions to improve the quality of solutions over time as well as directed heuristics to identify a superior operating state for the hydrogen pipeline network. Of course one of ordinary skill in the art will recognize that embodiments of the invention may be adapted for use with pipeline systems carrying other substances. For example, embodiments of the invention may be adapted for a pipeline having similar characteristics to a hydrogen pipeline, e.g., a pipeline system transporting a substance obtained from multiple disparate sources with differing input purity.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A computer-implemented method of optimizing operations of a hydrogen pipeline network, comprising:
reading a set of input data describing a hydrogen pipeline, a plurality of hydrogen production sources configured to introduce hydrogen into the hydrogen pipeline, a plurality of hydrogen consumers configured to remove hydrogen from the pipeline, a plurality of optimization parameters to use in an optimization run, and one or more optimization run termination conditions;
generating a population of solutions, wherein each solution specifies a feasible operating state for the hydrogen pipeline, the plurality of hydrogen production sources, and the plurality of hydrogen consumers, and wherein the population of solutions are generated by:
generating a first group of solutions using a random process, and
generating a second group of solutions, wherein the second group of solutions are generated according to one or more heuristic rules derived from past experience in operating the hydrogen pipeline network;
evaluating each solution in the population of solutions to generate an evaluation score for each solution;
repeatedly performing a genetic optimization process on the population of solution to evolve the population of solutions until one of the termination conditions are satisfied;
selecting one of the solutions from the evolved population of solutions, wherein the selected solution has a highest evaluation score, relative to the solutions in the evolved population of solutions; and
applying one or more heuristic rules to the selected solution, wherein each heuristic rule is applied to further optimize the operating state for the hydrogen pipeline specified in the selected solution.

2. The method of claim 1, wherein the genetic optimization process specifies hydrogen flows through the pipeline and the allocation of flows through looping segments of the pipeline, and wherein a direct pressure optimization technique is used to optimize pressures once the hydrogen flows are allocated by the genetic optimization process.

3. The method of claim 1, wherein the hydrogen production sources include one or more steam methane reforming units, one or more off-gas processing units, one or more dome storage facilities and one or more third-party supply sources.

4. The method of claim 1, wherein performing the genetic optimization process comprises:
modifying at least one aspect of the feasible operational state specified by at least one solution in the population;
simulating the operation of the hydrogen pipeline network, according to the operational state specified by the modified solution;
evaluating the performance of the modified solution;
adding the modified solution to the population; and
selecting a solution from the population to remove from the population of the solutions.

5. The method of claim 4, wherein modifying at least one aspect of the feasible operational state specified by at least one solution in the population, comprises:
selecting a solution modification technique;
selecting the at least one solution from the population to modify; and
modifying the at least one solution, according to the selected solution modification technique.

6. The method of claim 5, wherein the solution modification technique randomly modifies the least one aspect of the feasible operational state specified by the solution.

7. The method of claim 5, wherein the solution modification technique modifies the at least one solution according to one of the heuristic rules.

8. The method of claim 5, wherein the solution modification technique cross-breeds two or more solutions to generate the modified solution.

9. The method of claim 1, wherein modifying at least one aspect of the feasible operational state specified by at least one of the solutions in the population, comprises probabilistically selecting the one or more solutions, wherein a solution with a superior evaluation is more likely to be selected for modification than a solution with an inferior evaluation.

10. The method of claim 1, wherein selecting the solution to remove from the population of the solutions comprises probabilistically selecting the solution to remove, wherein a solution with a superior evaluation is less likely to be selected for removal than a solution with a superior evaluation.

11. The method of claim 1, wherein the termination conditions specified by the input data comprise the termination conditions include at least one of a maximum number of solutions generated, a maximum amount of time spent, a maximum number of generations, and the generation of a solution that exceeds a specified evaluation.

12. The method of claim 1, wherein the set of input data is generated using data retrieved from a SCADA pipeline status database that stores a current operational state of the pipeline system.

13. A computer-readable storage medium containing a program which, when executed, performs an operation for optimizing operations of a hydrogen pipeline network, comprising:
reading a set of input data describing a hydrogen pipeline, a plurality of hydrogen production sources configured to introduce hydrogen into the hydrogen pipeline, a plurality of hydrogen consumers configured to remove hydrogen from the pipeline, a plurality of optimization parameters to use in an optimization run, and one or more optimization run termination conditions;
generating a population of solutions, wherein each solution specifies a feasible operating state for the hydrogen pipeline, the plurality of hydrogen production sources, and the plurality of hydrogen consumers, and wherein the population of solutions are generated by:
generating a first group of solutions using a random process, and
generating a second group of solutions, wherein the second group of solutions are generated according to one or more heuristic rules derived from past experience in operating the hydrogen pipeline network;
evaluating each solution in the population of solutions to generate an evaluation score for each solution;
repeatedly performing a genetic optimization process on the population of solution to evolve the population of solutions until one of the termination conditions are satisfied;
selecting one of the solutions from the evolved population of solutions, wherein the selected solution has a highest evaluation score, relative to the solutions in the evolved population of solutions; and applying one or more heuristic rules to the selected solution, wherein each heuristic is applied to further optimize the operating state for the hydrogen pipeline specified in the selected solution.

14. The computer-readable storage medium of claim 13, wherein the genetic optimization process specifies hydrogen flows through the pipeline and the allocation of flows through looping segments of the pipeline, and wherein a direct pressure optimization technique is used to optimize pressures once the hydrogen flows are allocated by the genetic optimization process.

15. The computer-readable storage medium of claim 13, wherein the hydrogen production sources include one or more steam methane reforming units, one or more off-gas processing units, one or more dome storage facilities and one or more third-party supply sources.

16. The computer-readable storage medium of claim 13, wherein performing the genetic optimization process comprises:

modifying at least one aspect of the feasible operational state specified by at least one solution in the population;
simulating the operation of the hydrogen pipeline network, according to the operational state specified by the modified solution;
evaluating the performance of the modified solution;
adding the modified solution to the population; and
selecting a solution from the population to remove from the population of the solutions.

17. The computer-readable storage medium of claim 16, wherein modifying at least one aspect of the feasible operational state specified by at least one solution in the population, comprises:

selecting a solution modification technique;
selecting the at least one solution from the population to modify; and
modifying the at least one solution, according to the selected solution modification technique.

18. The computer-readable storage medium of claim 17, wherein the solution modification technique randomly modifies the least one aspect of the feasible operational state specified by the solution.

19. The computer-readable storage medium of claim 17, wherein the solution modification technique modifies the at least one solution according to one of the heuristic rules.

20. The computer-readable storage medium of claim 17, wherein the solution modification technique cross-breeds two or more solutions to generate the modified solution.

21. The computer-readable storage medium of claim 13, wherein modifying at least one aspect of the feasible operational state specified by at least one of the solutions in the population, comprises probabilistically selecting the one or more solutions, wherein a solution with a superior evaluation is more likely to be selected for modification than a solution with an inferior evaluation.

22. The computer-readable storage medium of claim 13, wherein selecting the solution to remove from the population of the solutions comprises probabilistically selecting the solution to remove, wherein a solution with a superior evaluation is less likely to be selected for removal than a solution with a superior evaluation.

23. The computer-readable storage medium of claim 13, wherein the termination conditions specified by the input data comprise the termination conditions include at least one of a maximum number of solutions generated, a maximum amount of time spent, a maximum number of generations, and the generation of a solution that exceeds a specified evaluation.

24. The computer-readable storage medium of claim 13, wherein the set of input data is generated using data retrieved from a SCADA pipeline status database that stores a current operational state of the pipeline system.

25. A system for optimizing operations of a hydrogen pipeline network, comprising:

a processor; and
a memory containing an optimization program, which when executed by the processor, is configured to:
read a set of input data describing a hydrogen pipeline, a plurality of hydrogen production sources configured to introduce hydrogen into the hydrogen pipeline, a plurality of hydrogen consumers configured to remove hydrogen from the pipeline, a plurality of optimization parameters to use in an optimization run, and one or more optimization run termination conditions,
generate a population of solutions, wherein each solution specifies a feasible operating state for the hydrogen pipeline, the plurality of hydrogen production sources, and the plurality of hydrogen consumers, and wherein the population of solutions are generated by:
generating a first group of solutions using a random process; and
generating a second group of solutions, wherein the second group of solutions are generated according to one or more heuristic rules derived from past experience in operating the hydrogen pipeline network,
evaluate each solution in the population of solutions to generate an evaluation score for each solution,
repeatedly perform a genetic optimization process on the population of solution to evolve the population of solutions until one of the termination conditions are satisfied,
select one of the solutions from the evolved population of solutions, wherein the selected solution has a highest evaluation score, relative to the solutions in the evolved population of solutions, and
apply one or more heuristic rules to the selected solution, wherein each heuristic is applied to further optimize the operating state for the hydrogen pipeline specified in the selected solution.

26. The system of claim 25, wherein the genetic optimization process specifies hydrogen flows through the pipeline and the allocation of flows through looping segments of the pipeline, and wherein a direct pressure optimization technique is used to optimize pressures once the hydrogen flows are allocated by the genetic optimization process.

27. The system of claim 25, wherein the hydrogen production sources include one or more steam methane reforming units, one or more off-gas processing units, one or more dome storage facilities and one or more third-party supply sources.

28. The system of claim 25, wherein performing the genetic optimization process comprises:

modifying at least one aspect of the feasible operational state specified by at least one solution in the population;

simulating the operation of the hydrogen pipeline network, according to the operational state specified by the modified solution;

evaluating the performance of the modified solution;

adding the modified solution to the population; and selecting a solution from the population to remove from the population of the solutions.

29. The system of claim 25, wherein modifying at least one aspect of the feasible operational state specified by at least one of the solutions in the population, comprises probabilistically selecting the one or more solutions, wherein a solution with a superior evaluation is more likely to be selected for modification than a solution with an inferior evaluation.

30. The system of claim 25, wherein selecting the solution to remove from the population of the solutions comprises probabilistically selecting the solution to remove, wherein a solution with a superior evaluation is less likely to be selected for removal than a solution with a superior evaluation.

31. The system of claim 25, wherein the set of input data is generated using data retrieved from a SCADA pipeline status database that stores a current operational state of the pipeline system.

* * * * *